United States Patent [19]
Lemajeur et al.

[11] Patent Number: 5,662,254
[45] Date of Patent: Sep. 2, 1997

[54] RACK FOR VEHICLES

[75] Inventors: Scott W. Lemajeur, Carol Stream; Don Kuball, Franklin Park, both of Ill.

[73] Assignee: Kar-Rite International, Franklin Park, Ill.

[21] Appl. No.: 515,994

[22] Filed: Aug. 16, 1995

[51] Int. Cl.$^6$ ................................................ B60R 9/00
[52] U.S. Cl. .................... 224/405; 224/553; 224/552; 296/3; 248/242
[58] Field of Search .................... 224/401, 403, 224/405, 488, 490, 502, 504, 505–509, 522–525, 534, 537, 310, 553, 924; 280/4; 296/3; 211/182, 195; 248/242, 291.1, 122.1

[56] References Cited

U.S. PATENT DOCUMENTS

| | | | |
|---|---|---|---|
| 346,355 | 4/1886 | Weger, Jr. et al. . | |
| 485,589 | 11/1892 | Miles et al. | 248/242 |
| 667,992 | 2/1901 | Patzold | 248/242 |
| 1,076,104 | 10/1913 | Crossley . | |
| 1,189,835 | 7/1916 | Stark et al. | 224/553 |
| 1,915,371 | 6/1933 | Lowman | 248/242 |
| 2,483,758 | 10/1949 | Douglas | 248/242 |
| 2,878,945 | 3/1959 | Speir | 108/44 |
| 3,013,681 | 12/1961 | Garnett . | |
| 3,058,607 | 10/1962 | Kiley . | |
| 3,213,965 | 10/1965 | Fedoryk | 248/242 |
| 3,329,324 | 7/1967 | Fuller | 224/507 |
| 3,485,382 | 12/1969 | Larson | 248/242 |
| 3,963,136 | 6/1976 | Spanke . | |
| 4,138,046 | 2/1979 | De Freze | 224/405 |
| 4,394,948 | 7/1983 | Graber | 224/506 |
| 4,509,787 | 4/1985 | Knaack et al. . | |
| 4,531,774 | 7/1985 | Whatley | 224/404 |
| 4,618,083 | 10/1986 | Weger, Jr. . | |
| 4,844,490 | 7/1989 | Kohler . | |
| 4,944,434 | 7/1990 | Hamilton | 224/552 |
| 5,009,350 | 4/1991 | Schill et al. . | |
| 5,020,708 | 6/1991 | Kolbach | 224/506 |
| 5,050,785 | 9/1991 | Hays | 224/924 |
| 5,058,791 | 10/1991 | Henriquez et al. . | |
| 5,092,503 | 3/1992 | Cocks | 224/508 |
| 5,104,280 | 4/1992 | Ziaylek et al. | 280/4 |
| 5,190,195 | 3/1993 | Fullhart et al. | 224/924 |
| 5,255,951 | 10/1993 | Moore, III | 224/405 |
| 5,297,912 | 3/1994 | Levi . | |
| 5,330,084 | 7/1994 | Peters | 224/506 |
| 5,360,150 | 11/1994 | Praz . | |
| 5,413,260 | 5/1995 | McFarland | 224/527 |
| 5,456,564 | 10/1995 | Bianchini | 224/508 |

OTHER PUBLICATIONS

Weekender ladder rack brochure, Knaack Manufacturing, Mar. 1994.

Diamond Plate ladder rack brochure, Cross Tread Industries, Feb. 1995.

*Primary Examiner*—Henry J. Recla
*Assistant Examiner*—Gregory M. Vidovich
*Attorney, Agent, or Firm*—Laff, Whitesel, Conte & Sarat, Ltd.

[57] ABSTRACT

A vehicle rack for ladders or other elongated cargo includes a carrying surface and a structure which permits the carrying surface to be adjusted between two fixed positions, both of which can be used for transporting ladders or other elongated cargo. The rack consists of a pair of frames, and each frame includes assemblies generally formed from elongated members. The frame's post assembly has a foot portion which can be releasably secured to the vehicle and an upper portion to which an arm assembly is rotatably connected at one of the arm assembly ends, thereby forming an inverted L-shape. A brace has one end connected to a mid-point of the post assembly and another end connected to a mid-point in the arm assembly. The brace can be attached to one or the other of two attachment areas to position the arm assembly in either of the two fixed positions.

15 Claims, 4 Drawing Sheets

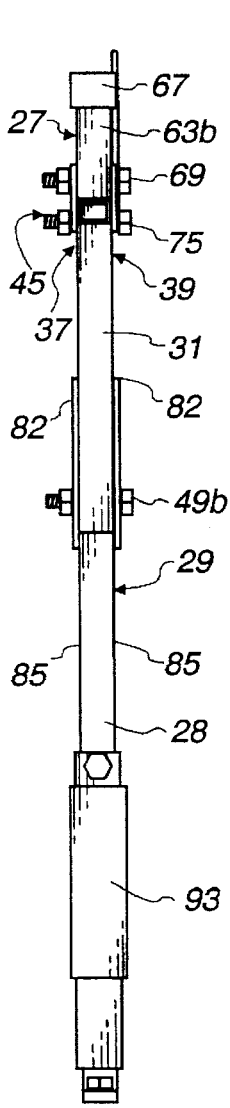
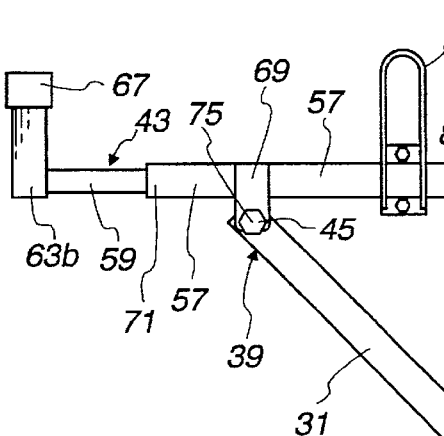
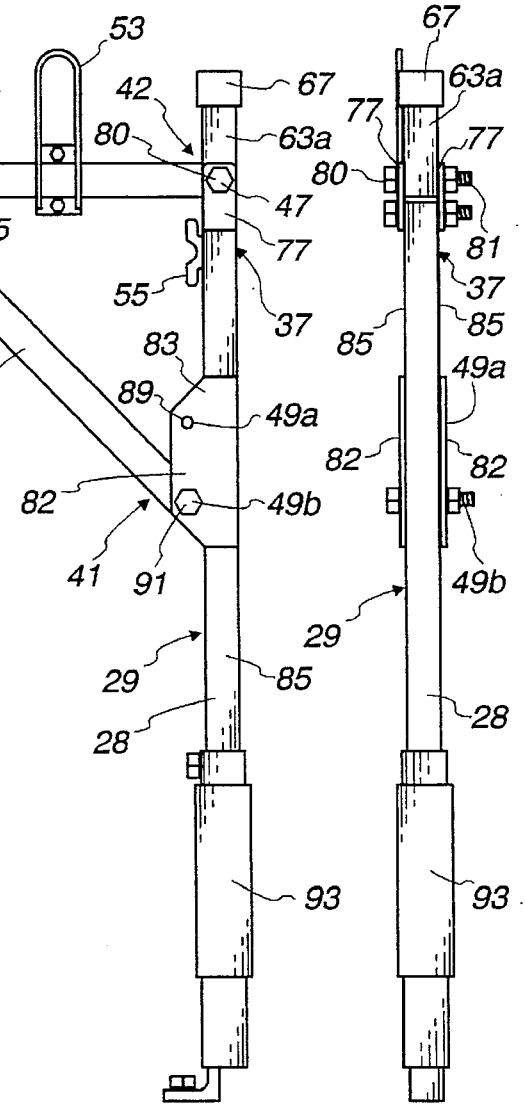
Fig. 3   Fig. 4   Fig. 5
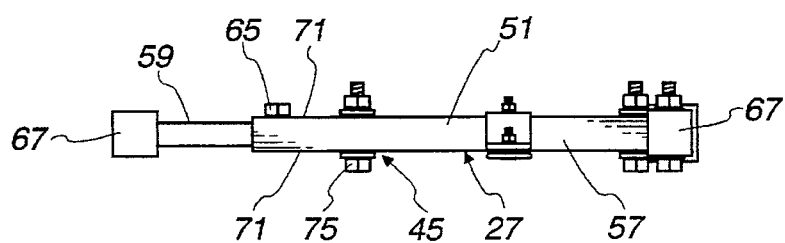
Fig. 6

RACK FOR VEHICLES

FIELD

This invention relates to apparatus for transporting articles, and more particularly, to a vehicle rack for ladders or other elongated cargo.

BACKGROUND

Racks for carrying ladders on vehicles suffer from various drawbacks and disadvantages. The pick-up truck ladder rack disclosed in the publication of Cross Tread Industries, Inc., includes a fixed horizontal member which carries the ladder between two vertical uprights in a single, fixed, horizontal position above the pick-up truck. It is generally difficult to load and unload ladders or other elongated cargo to and from the raised horizontal position of such ladder racks. In particular, before the ladder can be removed, it must be lifted vertically to an even higher position to clear the uprights on either side of the horizontal member carrying the ladder. After such vertical lifting, the ladder must be displaced laterally from its position over the truck to clear the ladder rack. The loading of ladders onto the horizontal members of such racks presents the same obstacles in reverse order. In some situations, it is necessary for the individual seeking to load or unload ladders from these racks to climb onto or into the truck which can be dangerous as well as impractical.

The ladder rack model 1475-B of Knaack Manufacturing Company includes two frame members, each having a surface for carrying the ladders fixed in an inclined position relative to the chassis of the vehicle to which the rack is mounted. Ladders in these racks are carried in a position tilting toward the side of the pick-up truck. Among the disadvantages of such a design is that generally only one or perhaps two ladders can be carried in such an inclined position. Bulky ladders or other elongated cargo, as well as multiple ladders, cannot generally be transported in the inclined position of these racks without risking that they will slip or otherwise be dislodged from the downwardly inclined carrying surfaces of the rack.

Other vehicle racks for carrying ladders generally include unnecessarily complex mechanisms intended to facilitate loading and unloading of the ladders or other elongated articles carried on such racks. Such racks are disclosed in U.S. Pat. No. 3,013,681 to Garnett, U.S. Pat. No. 5,297,912 to Levi, U.S. Pat. No. 5,058,791 to Henriquez, and U.S. Pat. No. 5,360,150 to Praz. The numerous structural members used in these vehicular racks make them costly and heavy. In addition, the structure disclosed in the Garnett reference does not lend itself to easy installation or de-installation on a vehicle. The structures of Levi, Henriquez and Praz are ill-suited for use in the beds of pick-up trucks.

In the above and other references of the current art, the structurally complex mechanisms temporarily lower ladders or other elongated cargo from a single storage and transportation position located generally out to the side of the vehicle for loading and unloading. These racks are not capable of safely or effectively transporting ladders in the lowered position.

It would thus be desirable for a vehicle rack for transporting ladders to be easily installed in or removed from a vehicle. It would be equally desirable for such rack to be capable of carrying not only a single ladder or piece of elongated cargo, but also multiple ladders or other bulky elongated items. Further, there is a need for the vehicle rack to provide relatively convenient access to the cargo without complex, costly, or needlessly heavy structural elements. There is a need, as well, for the ladder rack to be capable of transporting the cargo in an easily accessible position so that the user does not suffer the inconvenience of having to activate structural mechanisms on the rack before or after transportation of the cargo.

SUMMARY

Accordingly, an object of this invention is to provide an apparatus for carrying one or more ladders or other elongated articles in a first position which permits multiple items of that nature to be transported safely, and in a second position which eases access to the transported cargo.

Another object of this invention is to provide a vehicle rack which is easily installed or removed from the vehicle and is relatively lightweight and not costly.

The foregoing and other objects and advantages are attained by a vehicle rack according to the present invention with at least one frame, the frame including a post assembly, a rotatable arm assembly attached to the post assembly, and a structure for releasably securing the arm assembly in two positions.

The structure, according to one aspect of the invention, is mounted between the two ends of the post assembly and includes a support plate with two attachment areas. A brace is connected between the post assembly and the arm assembly. When the brace is secured to one of the attachment areas, the arm assembly is in the first position. When the brace is secured to the other of the attachment areas, the arm assembly is in the second position. The attachment areas are spaced along the length of the post assembly.

According to another aspect of the invention, two support plates are mounted to opposite sides of the post assembly and the brace fits into a channel defined between the support plates.

According to still another aspect of the invention, the arm assembly includes an extension arm which is telescopically received into the arm assembly for adjusting the amount of surface available for carrying the ladder.

According to still another aspect of the invention, a mechanism is provided to releasably mount one or two of the vehicle rack frames to the vehicle. Two frames can be mounted in spaced relation to each other to support the elongated cargo substantially between the two of them.

DESCRIPTION OF THE DRAWINGS

Still other objects, advantages, and novel aspects of the present invention will become apparent in the detailed description of a preferred embodiment which includes the best mode for carrying out the invention, and by reference to the attached drawing in which:

FIG. 3 is a front elevational view of one of the frames of the rack shown in FIG. 1;

FIG. 4 is a side elevational view of the frame shown in FIG. 3;

FIG. 5 is a rear elevational view of the frame shown in FIG. 4;

FIG. 6 is a top plan view of the frame shown in FIG. 3;

DESCRIPTION

Figure 1:
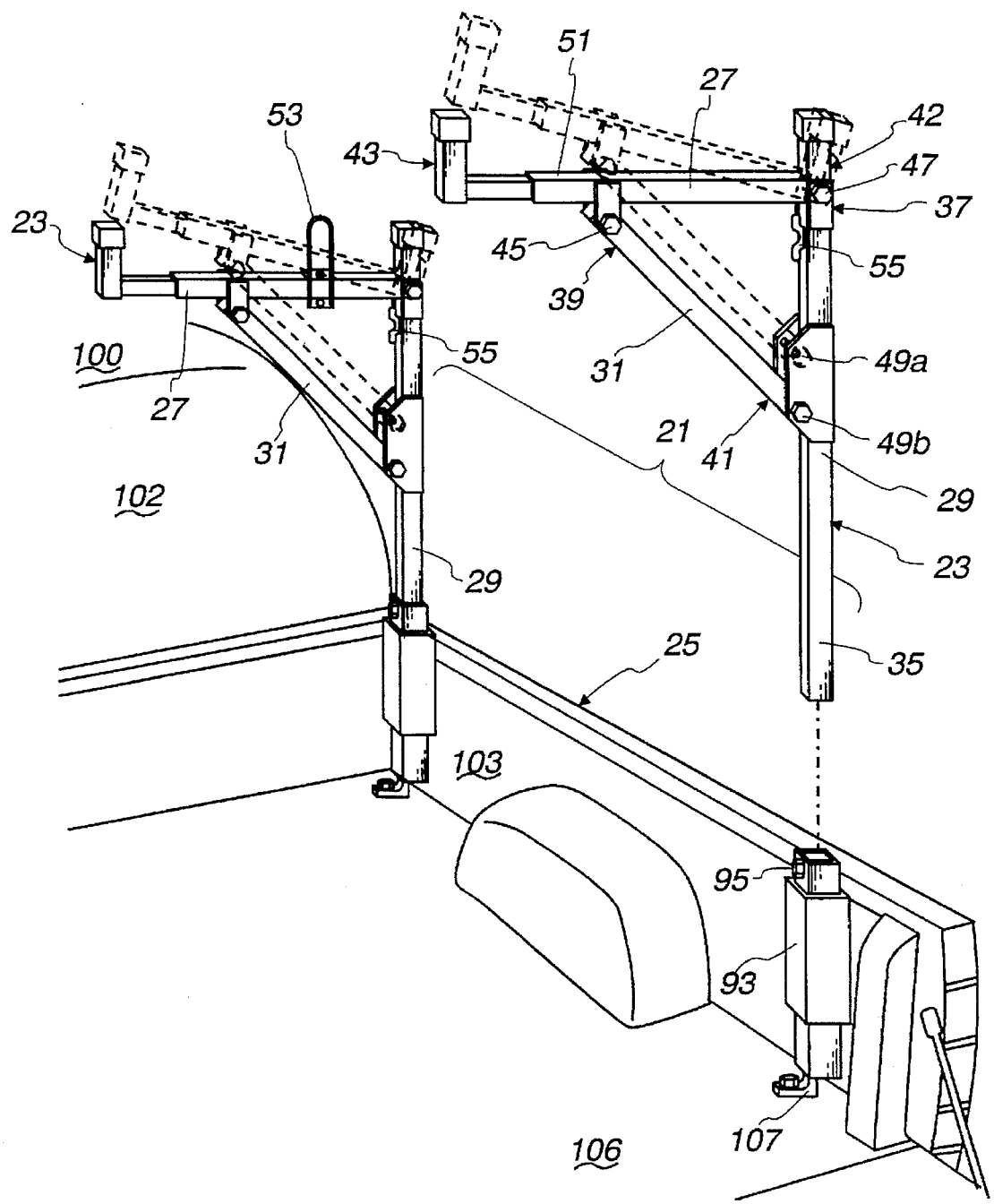
FIG. 1 is a perspective view of a truck with a rack incorporating the principles of the invention.

Referring now to the drawings, and to FIG. 1 in particular, a vehicle rack 21 for ladders or other elongated cargo includes a pair of frames 23 mounted in spaced relation to each other upon a vehicle 25. The rack 21 can be adjusted so that arm assemblies 27 can be secured in two positions, one of the positions (shown in solid lines) being generally horizontal with respect to the vehicle chassis or ground, and the other of the positions (shown in phantom lines) being tilted at an angle with respect to the first position.

Referring generally to FIGS. 1-6, each of the frames 23 includes tubular elongated members interconnected to each other at selected points to create the necessary structure for carrying ladders in the two alternative positions. Each of the frames 23 is formed from three assemblies: the arm assembly 27, a post assembly 29, and a brace 31. The post assembly 29 includes an elongated member or standard 28 and has a foot 35 at one end adapted to be releasably secured to the vehicle 25, and an opposite, upper end 37 extending generally upwardly from the chassis of the vehicle 25. The arm assembly 27 has one end 42 connected to the upper end 37 of the post assembly 29, and the arm assembly 27 extends outwardly from the post assembly 29 to terminate in a free end 43. The brace 31 has one end 39 attached to the arm assembly 27 between its free end 43 and the end 42. The other end 41 of the brace 31 is connected to the post assembly 29 between the foot 35 and the upper end 37 of the post assembly 29.

The assemblies 27, 29, 31 are thus interconnected at three areas: area 45 between the brace 31 and the arm assembly 27, area 47 between the arm assembly 27 and the post assembly 29, and either area 49a or area 49b between the brace 31 and the post assembly 29. The lengths of the members in assemblies 27, 29, 31 and the locations of the attachment areas 45, 47, 49 have been selected so that, when the end 41 is attached to the post assembly 29 at the area 49b shown in solid lines in FIG. 1, the arm assembly 27 has a surface 51 disposed generally horizontally with respect to the chassis of the vehicle 25. When the end 41 is attached at the area 49a, however, the arm assembly 27 rotates about a horizontal axis in the area 47, the free end 43 is raised higher in relation to the vehicle 25, and the surface 51 is repositioned to be tilted or angled by about 15° with respect to the previous position of the surface 51, as shown by the phantom lines of FIG. 1.

Figure 7:
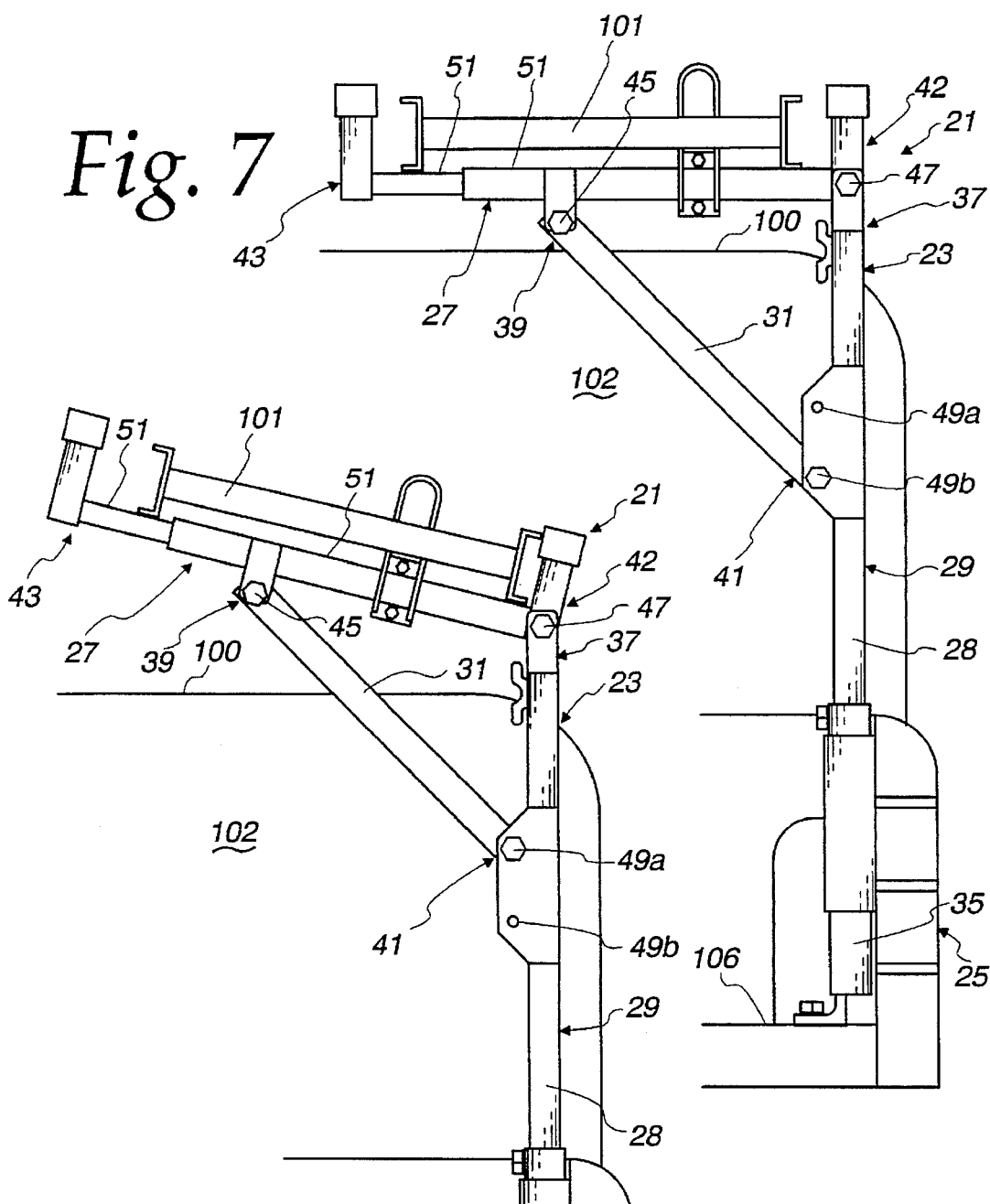
FIG. 7 is a side elevational view of the frame shown in FIG. 3 with a ladder carried thereon in the horizontal position.
Figure 8:
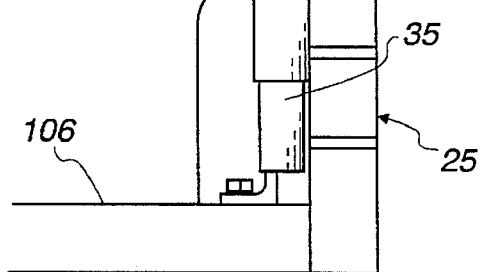
FIG. 8 is a side elevational view of the frame shown in FIG. 3 with a ladder carried thereon in the tilted position.

In use, one or more ladders or other elongated articles are placed on the surfaces 51 of the pair of frames 23 shown in FIG. 1. Referring to FIGS. 7 and 8, a ladder is shown positioned on the surface 51 of the frame 23. The surface 51 of each of the two frames 23 may be either in the generally horizontal position shown in FIG. 7 and in the solid lines of FIG. 1, or in the tilted position shown in FIG. 8 and in the phantom lines of FIG. 1. The rack 21 is capable of carrying the ladder 101 or other elongated cargo in either of the two positions. The ladders or other elongated cargo carried by the frames 23 may be further secured against vibration or slippage by means of an optional ladder bracket 53 (FIG. 1) which impedes front-to-back motion of the cargo relative to the vehicle 25, or by tying down the cargo with cord (not shown) which is secured to the frames 23 with the aid of hooks 55 mounted at the upper end 37 of the post assembly 29.

Figure 2:
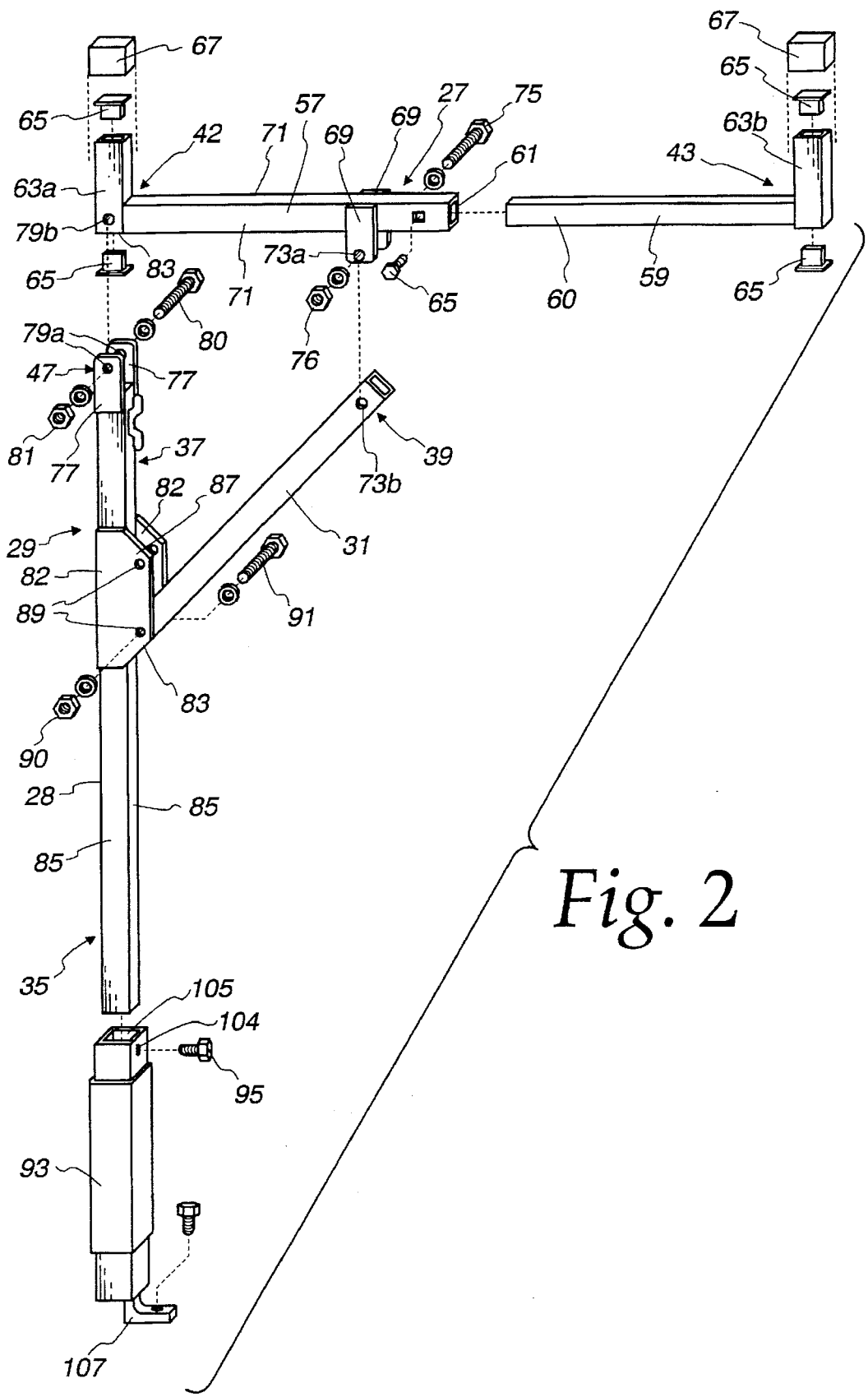
FIG. 2 is an exploded perspective view of one of the frames of the rack of FIG. 1.

The arm assembly 27 of one of the two frames 23 shown in FIG. 1 is now described with particular reference to FIGS. 2 and 4. The arm assembly 27 includes a primary member 57 in the form of a tube with an opening 61 and an extension arm 59 which is telescopically received within the primary arm 57 through the opening 61. The passage through primary member 57 is sufficiently long to fully receive the extension arm 59. An upright 63a is attached to the primary member 57 at the end 42 of the arm assembly 27, and a second upright 63b is attached to the extension arm 59 at the free end 43 of the arm assembly 27. The uprights 63a, 63b extend upwardly, as shown in the drawings, from the arm assembly 27. The length of the surface 51 extends between the uprights 63a, 63b. The extension arm 59 thus may be telescopically displaced relative to the member 57 to adjust the total length of the surface 51 available to carry ladders or other elongated objects. Means, here shown as screw 65, is provided to secure the arm 59 against inadvertent motion relative to the member 57. The screw 65 is received into a hole (not shown) in side 60 of the extension arm 59. Additional holes may be drilled into the side 60 to provide multiple adjustment positions for the arm 50 relative to the primary member 57.

Each of the uprights 63a, 63b is formed by tubular members. Plugs 65 are inserted into openings at opposite ends of the uprights 63a, 63b and caps 67 are sized to fit over the upper end of the uprights 63a, 63b. The plugs 65 and the caps 67 inhibit moisture and other foreign matter from entering the uprights 63a, 63b.

A pair of plates 69 is mounted to opposing sidewalls 71 of the arm assembly 27. In this embodiment, the plates 69 are located on the primary member 57 at a location which is laterally spaced from the end 42. The plates 69 extend from the arm assembly 27 in a direction opposite the extension of the uprights 63a, 63b in this case downwardly when referring to the drawings.

The arm assembly 27 is rotatably connected to the brace 31 by means of the plates 69 which have axially aligned holes 73a which can be aligned With corresponding holes 73b at the end 39 of the brace 31. Fastening means, here shown as nut 76 and bolt 75, connect the arm assembly 27 and the brace 31 at their respective holes 73a, 73b. The holes 73a, 73b in the plates 69 and the brace 31 are located toward the edges of their respective members so that sufficient clearance is maintained between the arm assembly 27 and the brace 31 during rotation about the pivot axis in area 45. The rotation is thus not inhibited by contact between the members 27 and 31 at locations other than the pivot axis in area 45.

Referring to FIGS. 2, 4, and 5, the arm assembly 27 is rotatably connected to the post assembly 29 at the end 42. In particular, the post assembly 29 has a pair of plates 77 mounted to opposite sides 85 of the elongated member or standard 28. The plates 77 extend upwardly with reference to the drawings from the upper end 37 of the post assembly 29. The plates 77 have axially aligned holes 79a located toward the upper end of the plates 77. The holes 79a in the plates 77 may be aligned with corresponding axially aligned holes 79b in opposite sides 71 of the arm assembly 27 FIG. 2) which are located at or near the end 42 of the arm assembly 27.

The holes 79a, 79b are located so that, when the arm assembly 27 is attached to the post assembly 29 at the area 47 by nut 81 and bolt 80 or other suitable fastening means, there is a clearance between the arm assembly 27 and the post assembly 29 at the area 47. The clearance is sufficient so that the arm assembly 27 may be rotated about a pivot axis in the area 47 between the two positions best shown in FIG. 1 without contact between the arm assembly 27 and the post assembly 29 at locations in area 47 other than the pivot axis.

A pair of support plates 82 is mounted to the opposite sides 85 of the member 28 between the foot portion 35 and the upper end 37 of the post assembly 29. Each of the support plates 82 includes portions 83 which extend from the post assembly 29 in the same direction that the arm assembly 27 extends from the post assembly 29. The portions 83 extend along the length of the member 28 to define the two attachment areas 49a and 49b which are vertically spaced from each other in this embodiment. Means are provided to releasably secure the brace 31 at either of the attachment areas 49b, 49a. In this embodiment, such means include axially aligned holes 89 in each of the attachment areas 49a, 49b, corresponding holes (not shown) in opposite sides of the brace 31 located at the end 41, and bolt 91 sized to be insertable into the holes 89 and held there by nut 90.

When the end 41 of the brace 31 is attached at the attachment area 49b, the rack 21 maintains the arm assembly 27 in the generally horizontal position (FIG. 7 and the solid lines of FIG. 1). When the end 41 is attached at the attachment area 49a, the arm assembly 27 is in the tilted position (FIG. 8 and the phantom lines of FIG. 1). The arm assembly is switched between the two positions as follows: the nut 90 and bolt 91 are unfastened, the bolt 91 is removed from the holes 89 and from the holes in the end 41, the end 41 of the brace 31 is repositioned to the other of the attachment areas 49a or 49b, and then the brace 31 is reattached at the selected attachment area by means of nut 90 and bolt 91.

Referring again to FIGS. 1 and 2, the rack 21 includes means for releasably securing one or more of the frames 23 to the vehicle 25. Such means are shown as a tube 93 secured to side 103 of the vehicle 25 by any suitable fastening means. The tube 93 is also secured to bed 106 of the truck by means of bracket 107. The bracket 107 is attached to the bed 106 by any suitable fastening means.

The tube 93 has a passage 105 extending longitudinally through it which is of sufficient size to telescopically receive the foot portion 35 of the elongated member 28. The frame 23 is held in place relative to the tube 93 by means of set screw 95. The screw 95 is threadably extended through a hole 104 (FIG. 2) in the sidewall of the tube 93 and into the passage 105 until it contacts the foot portion 35 to hold the frame 23 in position. This cooperation of the tube 93 and the frame 23 allows the frame 23 to be installed in or removed from the vehicle 25 by sliding the frames 23 either into or out of the tube 93 and either tightening or loosening the screw 95 as required.

The various members and plates of the vehicle rack 21 are preferably made of metal, such as carbon-reinforced steel, although alternate materials may be used, so long as they are sufficiently strong to carry the anticipated loads of the ladders or other elongated cargo. A load limit acceptable for many uses is 250 pounds, generally evenly distributed over the surfaces 51 of a pair of the frames 23.

The elongated members of the vehicle rack 21 may be hollow steel tubes having a generally rectangular or square transverse cross-section. The member 28 of the post assembly 29 may have various lengths depending on the particular vehicle in which it is to be installed, or the particular application. For example, a length of 46" has been found suitable for use in pick-up truck bed 106, as such length positions the carrying surface 51 high enough above the pick-up truck bed 106 to allow the truck bed 106 to be used concurrently as a load platform. Such height also allows the elongated cargo to clear the top 100 of the pick-up truck cab 102 if necessary.

Similarly, the lengths of the brace 31 and the arm assembly 27 may be varied to suit particular vehicles or particular applications. Suitable lengths for an embodiment for pick-up trucks to carry ladders or other elongated cargo would include a brace 31 of about 23" in length, and an arm assembly 27 with a primary arm 57 of about 24½" in length and an extension arm of about 22" or 23" in length. The angle at which the surface 51 is tilted, in the non-horizontal position, may also be varied.

The location of the attachment areas 45, 47, and 49b and 49a, may be chosen to meet the requirements of the particular vehicle or application. In this preferred embodiment, attachment area 45 is located about 18" or 19" from the free end 43, and attachment area 47 is located substantially at the end 42 of the arm assembly 27. Attachment area 49a is about 11½" and area 49b is about 16" from the end 37. As such, the frame 23 resembles an inverted L. Alternative embodiments according to the present invention could shift the locations of the attachment areas. For example, the attachment area 47 may be shifted from the end 42 of the arm assembly toward the free end 43, making the frame generally T-shaped.

The uprights 63a, 63b on either side of the arm assembly 27 have been found suitable when 7" in length, although, of course, longer lengths may be used when bulkier items are involved, so as to prevent loss of such items from the carrying surfaces 51.

The elongated members of the rack 21 are preferably formed of 14-gauge carbon-reinforced steel tubing having a square cross-section with 1½-inch sides. However, the extension arm 59 is formed of smaller square tubing, with 1¼-inch sides, so as to facilitate telescoping of the extension arm 59 into the primary member 57. Similarly, the tube 93 is formed of a square tubing having 2" sides to facilitate insertion and removal of the foot 35 within the square tube 93.

The various plates 69, 77, 82 are preferably welded to their respective members, and are made of 11-gauge carbon-reinforced steel.

In addition to the advantages and novel features apparent from the above description, the vehicle rack 21 of the present invention is capable of carrying ladders or other elongated cargo in the two different fixed positions shown in FIGS. 1, 7 and 8. The tilted position (FIG. 8) offers the advantages of quick and relatively easy access to the material carried on the surfaces 51. The horizontal position (FIG. 7) offers the advantages of being able to safely and securely carry one or more ladders on a horizontal surface, thereby lessening the risk that such multiple or bulky objects will slip off the surface 51, which might occur when the surface 51 is in the tilted position. A single adjustment to each of the frames allows the user to change the rack between the two positions.

A further advantage of this structure is that a single rack can be used for transporting cargo in the easily accessible tilted position and also in the horizontal position. There is thus no need to have one rack for carrying cargo in the horizontal position and a second rack for carrying it in the tilted position.

Not only does the tilted position allow for easy loading or unloading of cargo, but the tilted position can also be used to carry the cargo from one point to another. There is thus no need for the user to move the rack to one position for loading and unloading and then move it to another, more secure position for transportation. The same tilted position can be used for loading and unloading as well as for carrying.

The above advantages are attained with minimal structural components, thus saving cost to the manufacturer and the consumer, as well as weight, making the racks easy to manipulate and install in vehicles. Not only does the lighter weight of these racks ease their installation, but the way the frames 23 are received within the tubes 93 makes installation in and removal from the vehicle a relatively simple and straightforward process. The rack 21 thus may be quickly set up when needed, and just as quickly removed for other uses of the vehicle.

While the present invention has been describe with reference to a preferred embodiment thereof, illustrated in the accompanying drawings, various changes and modifications can be made by those skilled in the art without departing from the spirit and the scope of the present invention. Therefore, the appended claims are to be construed to cover equivalent structures.

What is claimed is:

1. A vehicle rack for attachment to a vehicle having opposing upstanding sidewalls and for carrying elongated cargo comprising at least one frame, the frame comprising:

a post assembly adapted to be secured within a rigid receptacle mounted to one of the sidewalls;

an arm assembly rotatably mounted to the post assembly;

means for releasably securing the arm assembly in two positions; and a brace having a first end rotatably connected to the arm assembly and a second end rotatably connected to the post assembly;

wherein the securing means comprises a support plate secured to the post assembly, the support plate having two attachment areas, the second end of the brace being alternately securable to one attachment area to secure the arm assembly in the first position and to the second attachment area to secure the arm assembly in the second position.

2. The rack of claim 1, wherein the attachment areas are spaced along the length of the post assembly.

3. The rack of claim 1, wherein the arm assembly comprises a surface for carrying said elongated cargo, the surface being substantially horizontal in the first position and substantially tilted in the second position.

4. The rack of claim 3, comprising means for adjusting the amount of the surface available for carrying said elongated cargo.

5. The rack of claim 4, wherein the adjusting means comprise an extension arm telescopically received within the arm assembly.

6. The rack of claim 1 comprising a pair of the support plates on opposite sides of the post assembly, the support plates defining a channel adjacent the post assembly sufficiently wide to receive the second end of the brace.

7. The rack of claim 1 comprising two separate frames.

8. The rack of claim 1, wherein the arm assembly comprises an elongated member and a pair of uprights mounted at opposite ends of the elongated member, the uprights extending substantially perpendicularly to the elongated member to define a loading area between the uprights.

9. The rack of claim 8, comprising a foot portion located at a first end of the post assembly and wherein the arm assembly is connected to a second end of the post assembly.

10. The rack of claim 8, wherein the post assembly comprises a standard, and wherein the elongated member of the arm assembly extends from one side of the standard, the elongated member extending from the standard and terminating in a free end.

11. The rack of claim 10, wherein the standard and the elongated member are formed from tubing.

12. The rack of claim 10, wherein the location of the free end shifts between the two positions of the arm assembly, so that, when the standards are mounted to the vehicle, the free end is higher in relation to the vehicle in one of the positions than in the other of the positions.

13. The rack of claim 1, further comprising means to releasably secure the rack to the vehicle.

14. The rack of claim 13, wherein the securing means comprises said rigid receptacle, said receptacle comprising a tube which includes an opening sized to receive a foot portion of the post assembly therein.

15. A vehicle rack for attachment to a vehicle having opposing upstanding sidewalls and for carrying elongated cargo comprising a plurality of elongated members, wherein the elongated members include a post assembly having a foot portion adapted to be releasably secured within a rigid receptacle mounted to one of the sidewalls, an upper end opposite the foot portion, and two attachment areas spaced from each other and located substantially between the ends of the post assembly, an arm assembly having opposite ends, one end being an attachment end and the other being a free end, the attachment end rotatably attached to the upper end of the post assembly, and a brace, one end of the brace rotatably connected between the opposite ends of the arm assembly and the other end of the brace releasably attached to one of the attachment areas of the post assembly to position the arm assembly in a first, fixed position and to the other attachment area to position the arm assembly in a second, fixed position.

* * * * *